United States Patent
Panhans et al.

(10) Patent No.: US 11,897,476 B1
(45) Date of Patent: Feb. 13, 2024

(54) SYSTEM AND METHOD FOR CLOSE-IN-BORE LEARNING FOR A HYBRID VEHICLE

(71) Applicant: Ford Global Technologies, LLC, Dearborn, MI (US)

(72) Inventors: Justin Panhans, Detroit, MI (US); Minku Lee, Canton, MI (US); Fazal U. Syed, Canton, MI (US); Alec Bolthouse, Dearborn, MI (US); Francis Thomas Connolly, Ann Arbor, MI (US); Josh Holland, Amherstburg (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/821,325

(22) Filed: Aug. 22, 2022

(51) Int. Cl.
| | |
|---|---|
| *B60W 20/50* | (2016.01) |
| *B60W 50/02* | (2012.01) |
| *F02D 11/06* | (2006.01) |
| *F02D 9/10* | (2006.01) |
| *B60W 30/192* | (2012.01) |
| *B60W 10/06* | (2006.01) |
| *B60W 10/08* | (2006.01) |
| *F02D 11/10* | (2006.01) |

(52) U.S. Cl.
CPC .......... *B60W 30/192* (2013.01); *B60W 10/06* (2013.01); *B60W 10/08* (2013.01); *B60W 20/50* (2013.01); *F02D 9/105* (2013.01); *F02D 11/06* (2013.01); *B60W 2050/021* (2013.01); *B60W 2710/0605* (2013.01); *B60W 2710/0633* (2013.01); *B60W 2710/0644* (2013.01); *F02D 2011/108* (2013.01)

(58) Field of Classification Search
CPC .... B60W 30/192; B60W 10/06; B60W 10/08; B60W 20/50; B60W 2050/021; B60W 2710/0605; B60W 2710/0633; B60W 2710/0644; F02D 11/105; F02D 2011/108; F02D 9/105
See application file for complete search history.

(56) References Cited

U.S. PATENT DOCUMENTS

| | | | |
|---|---|---|---|
| 5,415,605 A * | 5/1995 | Yoshimura | F16H 61/12 477/121 |
| 6,009,371 A | 12/1999 | Kobayashi | |
| 6,874,468 B2 | 4/2005 | Watanabe | |
| 9,476,372 B2 | 10/2016 | Worthing et al. | |
| 2016/0280219 A1* | 9/2016 | Nawata | B60W 20/50 |
| 2018/0051635 A1* | 2/2018 | Mantovano | F02M 31/02 |
| 2019/0178190 A1* | 6/2019 | Dudar | F02M 35/1038 |

FOREIGN PATENT DOCUMENTS

| | | | | |
|---|---|---|---|---|
| DE | 19820047 A1 * | 11/1998 | | B60W 10/02 |
| JP | 2001032732 A * | 2/2001 | | F02D 2011/108 |
| JP | 5143145 B2 | 2/2013 | | |
| JP | 2013154699 A | 8/2013 | | |
| KR | 20070036231 A * | 4/2007 | | F02D 41/08 |

* cited by examiner

*Primary Examiner* — Tisha D Lewis
(74) *Attorney, Agent, or Firm* — David Kelley; McCoy Russell LLP

(57) ABSTRACT

Systems and methods for performing closed-in-bore diagnostics for a hybrid vehicle are presented. In one example, select operating conditions may be evaluated before closed-in-bore diagnostics may be initiated. In addition, charging of one or more batteries may be reduced to ensure that an engine throttle may operate with a small opening amount to evaluate the presence or absence of sludge in the engine throttle.

20 Claims, 4 Drawing Sheets

SYSTEM AND METHOD FOR CLOSE-IN-BORE LEARNING FOR A HYBRID VEHICLE

FIELD

The present description relates to methods and a system for compensating sludge in a bore of an engine throttle.

BACKGROUND AND SUMMARY

An engine may include a throttle to regulate fresh air flow into the engine. The throttle may be located just upstream of an intake manifold in an intake passage. While the throttle regulates fresh air into the intake manifold, it may also be exposed to exhaust gases, fuel vapors, and fuel droplets. Over a period of time, sludge may collect within the throttle bore. The sludge may reduce air flow through the engine, especially when the throttle is nearly closed. However, an engine of hybrid vehicle may spend little time at closed throttle positions in an effort to increase the efficiency of the engine. Therefore, it may be difficult to determine whether or not sludge is present in a throttle of a hybrid vehicle.

The inventors herein have recognized the above-mentioned issue and have developed a method for operating a vehicle, comprising: via one or more controllers, initiating a closed-in-bore diagnostic in response to a driveline disconnect clutch being fully closed, a vehicle speed being less than a threshold speed, a driver demand torque plus an accessory load torque being less than a first threshold torque, and a requested engine reserve torque being less than a second threshold torque.

By entering a closed-in-bore diagnostic in response to select hybrid vehicle operating conditions, it may be possible to perform a closed in throttle diagnostic without having to intrusively operate an engine of a hybrid vehicle and disturb vehicle operation. In particular, a hybrid vehicle may begin a closed-in-bore diagnostic when a driveline disconnect clutch is fully closed so that engine speed may be controlled. Further, closed-in-bore diagnostics may be performed when vehicle speed is less than a threshold speed, driver demand and accessory load torque are less than a first threshold torque, and requested engine reserve torque is less than a second threshold torque. The torque limitations allow engine torque to be at a lower level during closed-in-bore diagnostics so that engine air flow may be low, thereby allowing air flow through the engine to be evaluated at low throttle angles. In addition, enabling closed-in-bore diagnostics at low vehicle speed allows the diagnostic to be performed at idle and creep conditions where the diagnostic may have less possibility of influencing vehicle drivability.

The present description may provide several advantages. In particular, the approach may enable closed-in-bore diagnostics to be performed on a hybrid vehicle without noticeably affecting vehicle operation. Further, the approach may improve closed-in-bore diagnostics by precisely controlling engine speed so that engine air flow may be precisely controlled. Additionally, the approach may be activated whether or not a driveline disconnect clutch is fully closed.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
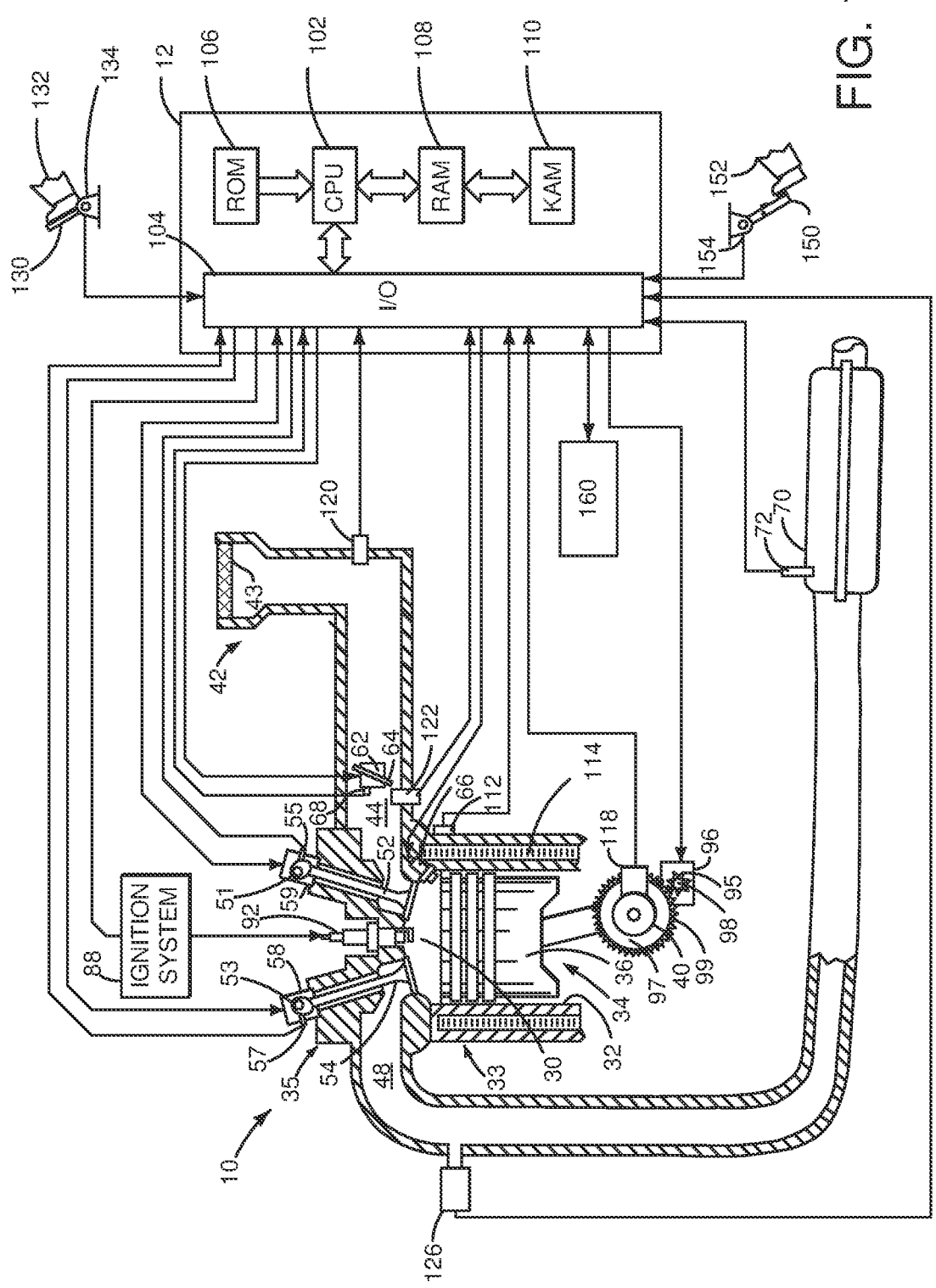
FIG. 1 is a schematic diagram of an engine.
Figure 2:
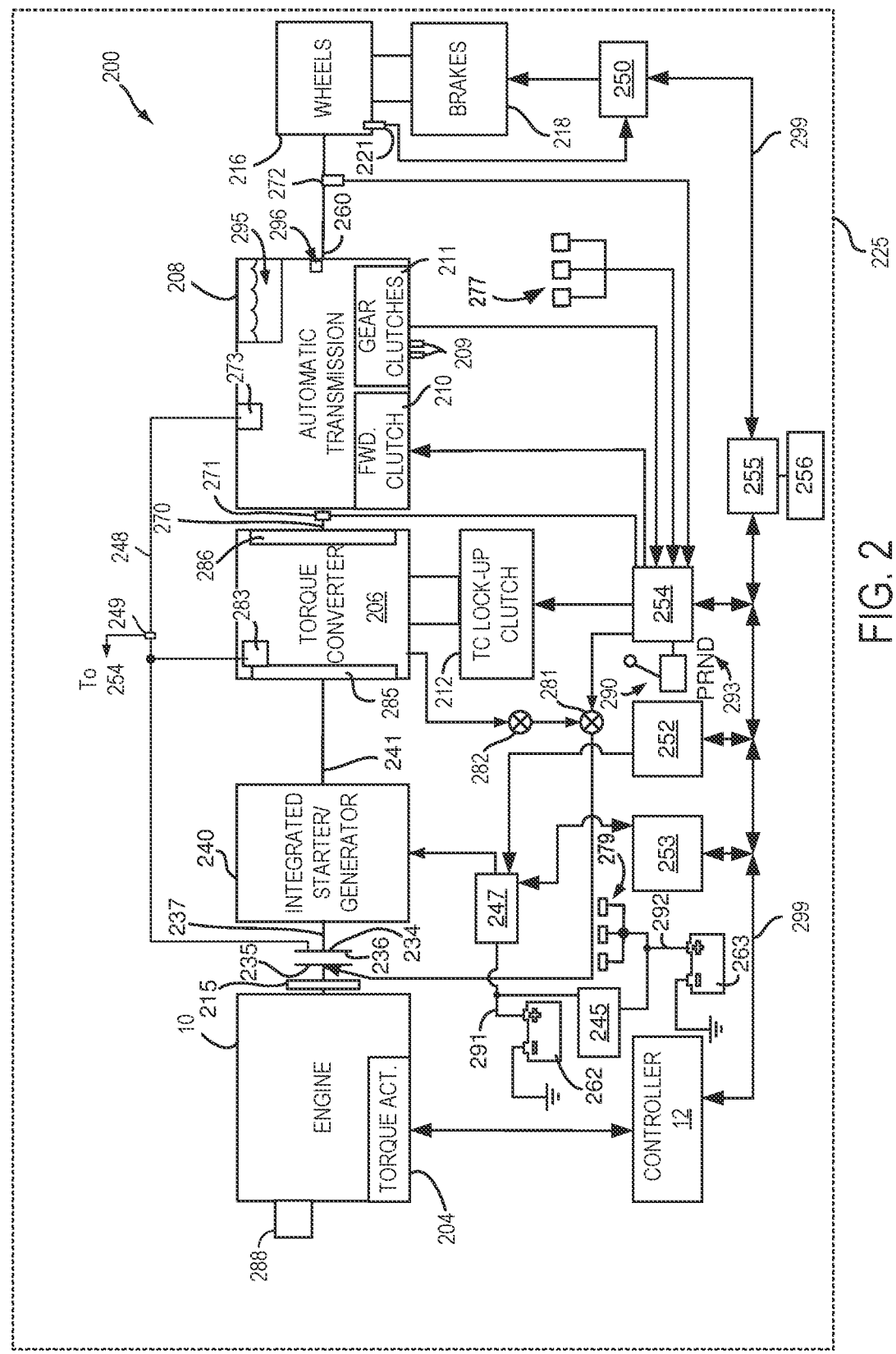
FIG. 2 is a schematic diagram of a hybrid vehicle driveline including the engine of FIG. 1.
Figure 3:
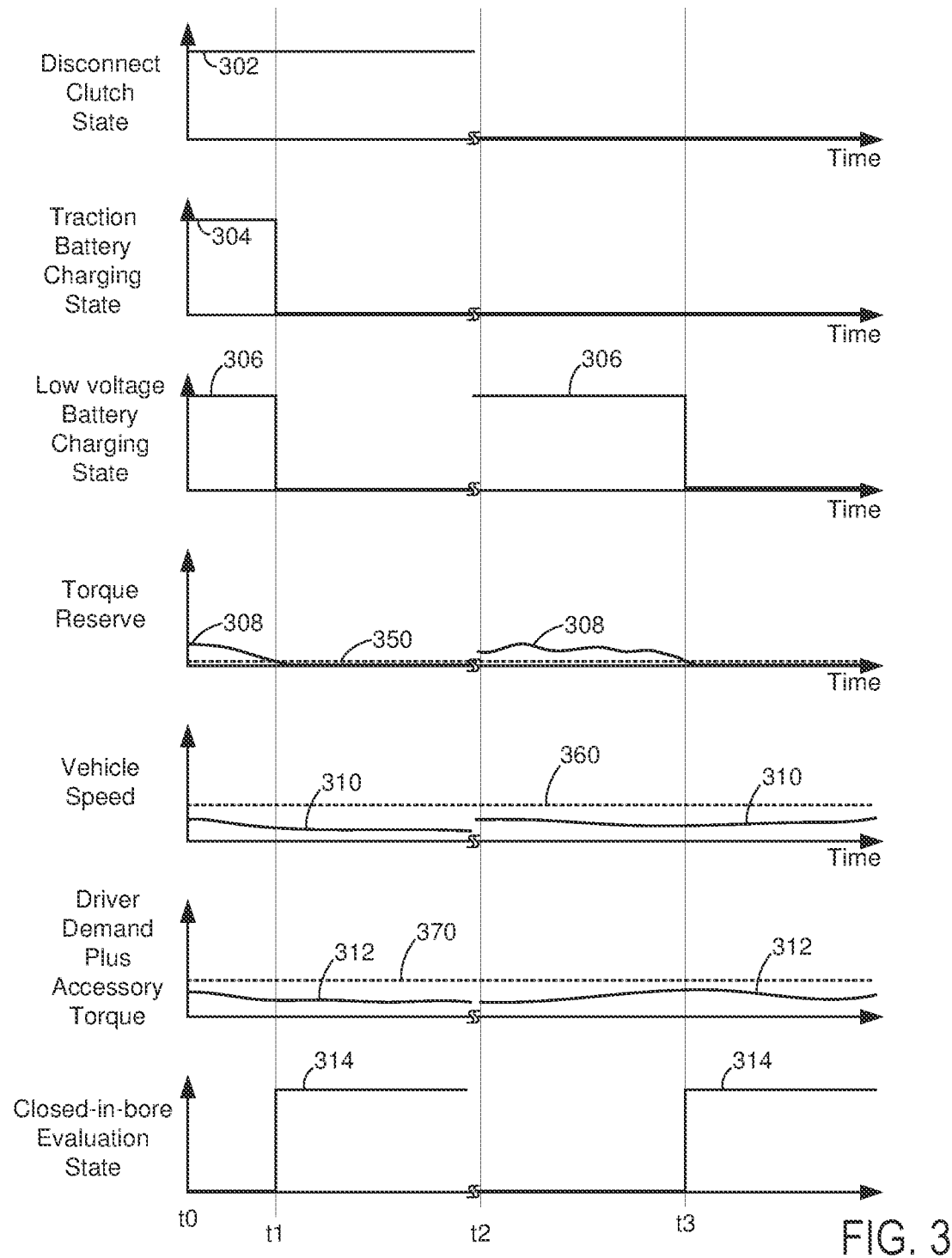
FIG. 3 shows example closed-in-bore diagnostic sequences according to the method of FIG. 4.
Figure 4:
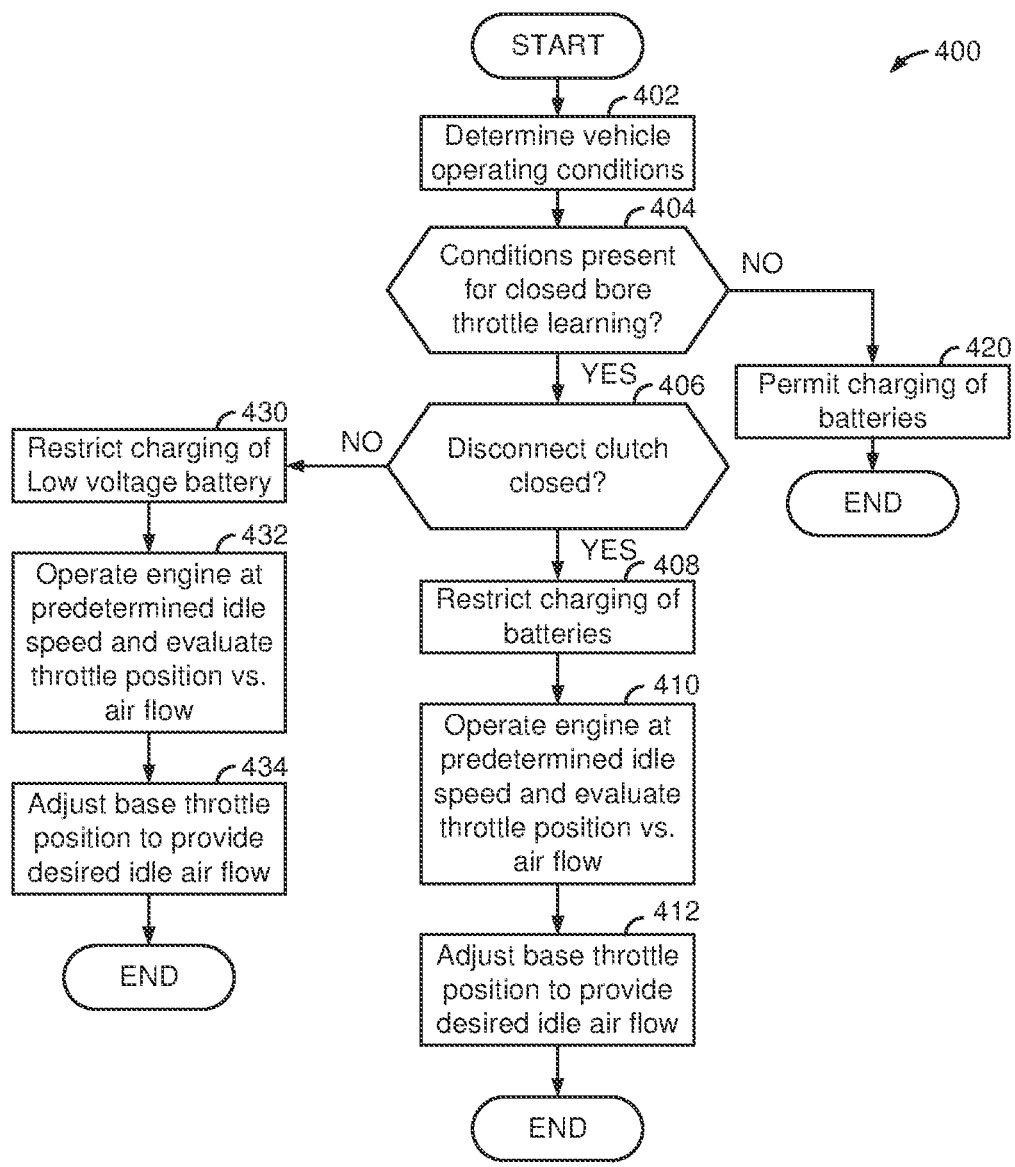
FIG. 4 shows a method for performing closed-in-bore diagnostics for a hybrid vehicle.

The present description is related to performing closed-in-bore diagnostics so that consistent engine operation may be provided even when sludge builds up within a throttle. In particular, entry conditions for performing closed-in-bore diagnostics on a hybrid vehicle are disclosed. In addition, charging of hybrid vehicle batteries is controlled during closed-in-bore diagnostics so that the engine may be operated at low throttle angles. The engine may be of the type that is shown in FIG. 1. The engine may be part of a hybrid powertrain or driveline as shown in FIG. 2. Closed-in-bore diagnostics may be performed as shown in the sequences of FIG. 3. A method for performing closed-in-bore diagnostics for a hybrid vehicle is shown in FIG. 4.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., a lower voltage (12 volts) electric energy storage device). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to electric energy storage device 263 and sensors/actuators/accessories 279. Sensors/actuators/accessories 279 may include but are not limited to front and rear windshield resistive heaters, vacuum pumps, climate control fans, and lights. Electric energy storage device 263 is also electrically coupled to flywheel starter 96 shown in FIG. 1. Inverter 247 converts DC power to AC power and vice-versa to enable power to be transferred between electric machine 240 and electric energy storage device 262. Optionally, driveline 200 may include an alternator 288 that converts torque from engine 10 to electric charge. The electric charge may be delivered to electric energy storage device 263.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric transmission fluid pump 273 may also be provided to pressurize transmission fluid 295. The transmission fluid may be applied as a coolant to cool the electric machine 240 and apply/release driveline disconnect clutch 236. Line or conduit 248 may receive transmission fluid 295 from electric transmission fluid pump 273 and/or pump 283. Pressure in conduit 248 may be sensed via pressure sensor 249.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; a transmission included in the driveline; a low voltage battery; a traction battery; and a controller including executable instructions stored in non-transitory memory that cause the controller to begin a closed-in-bore diagnostic and reduce charging of the low voltage battery in response to a vehicle speed being less than a threshold speed, a driver demand torque plus an accessory load torque being less than a first threshold torque, and a requested engine reserve torque being less than a second threshold torque. In a first example, the system further comprises additional instructions to reduce charging of the traction battery when the disconnect clutch is closed. In a second example that may include the first example, the system includes where the low voltage battery is coupled to a flywheel starter. In a third example that may include one or both of the first and second examples, the system includes where the closed-in-bore diagnostic is performed when the disconnect clutch is fully open. In a fourth example that may include one or more of the first through third examples, the system further comprises additional instructions to reduce an opening amount of an engine throttle. In a fifth example that may include one or more of the first through fourth examples, the system further comprises additional instructions to determine an engine air flow during the closed-in-bore diagnostic. In a sixth example that may include one or more of the first through fifth examples, the system further comprises additional instructions to determine a position of the engine throttle where the engine air flow is substantially equal to a predetermined air flow.

Referring now to FIG. 3, prophetic closed-in-bore diagnostic sequences are shown. The operating sequence of FIG. 3 may be provided via the system of FIGS. 1 and 2 in cooperation with the method of FIG. 4. The vertical lines at times t0-t3 represent times of interest during the operating sequence. The plots are time aligned and the SS marks along the horizontal axes represent breaks in time that may be long or short in duration.

The first plot from the top of FIG. 3 is a plot of a driveline disconnect clutch operating state versus time. The vertical axis represents the driveline disconnect clutch operating state and the driveline disconnect clutch is fully closed when trace 302 is at a higher level near the vertical axis arrow. The driveline disconnect clutch is fully open when trace 302 is at a lower level that is near the horizontal axis. The horizontal axis represents time and time increases from the left side of the plot to the right side of the plot. Trace 302 represents the driveline disconnect clutch operating state.

The second plot from the top of FIG. 3 is a plot of a traction battery charging state versus time. The vertical axis represents the traction battery charging state and the traction battery is charging (e.g., receiving charge) when trace 304 is at a higher level near the vertical axis arrow. The traction battery is not receiving charge when trace 304 is at a lower level that is near the horizontal axis. The horizontal axis represents time and time increases from the left side of the plot to the right side of the plot. Trace 304 represents the traction battery charging state.

The third plot from the top of FIG. 3 is a plot of a low voltage battery charging state versus time. The vertical axis represents the low voltage battery charging state and the low voltage battery is charging (e.g., receiving charge) when trace 306 is at a higher level near the vertical axis arrow. The low voltage battery is not receiving charge when trace 306 is at a lower level that is near the horizontal axis. The horizontal axis represents time and time increases from the left side of the plot to the right side of the plot. Trace 306 represents the low voltage battery charging state.

The fourth plot from the top of FIG. 3 is a plot of requested engine torque reserve versus time. The requested engine torque reserve is an amount of torque that the engine is capable of generating at the engine's present rotational speed and load beyond the torque that the engine is presently generating. Engine torque reserve may be produced via opening the engine's throttle and retarding engine spark timing. The vertical axis represents the requested engine torque reserve and the amount of the requested engine torque reserve increases in the direction of the vertical axis arrow. The horizontal axis represents time and time increases from the left side of the plot to the right side of the plot. Trace 308 represents the requested engine torque reserve. Horizontal line 350 represents a threshold amount of torque reserve.

The fifth plot from the top of FIG. 3 is a plot of vehicle speed versus time. The vertical axis represents the vehicle speed and the vehicle speed increases in the direction of the vertical axis arrow. The horizontal axis represents time and time increases from the left side of the plot to the right side of the plot. Trace 308 represents the vehicle speed. Horizontal line 360 represents a threshold vehicle speed.

The sixth plot from the top of FIG. 3 is a plot of driver demand torque plus accessory torque versus time. The vertical axis represents the driver demand torque plus accessory torque and the driver demand torque plus accessory torque increases in the direction of the vertical axis arrow. The horizontal axis represents time and time increases from the left side of the plot to the right side of the plot. Trace 310 represents the driver demand torque plus accessory torque. Horizontal line 370 represents a threshold torque.

The seventh plot from the top of FIG. 3 is a plot of closed-in-bore evaluation or diagnostic state versus time. The vertical axis represents the closed-in-bore evaluation or diagnostic state and the closed-in-bore evaluation or diagnostic state is asserted (e.g., the diagnostic is active) when trace 314 is at a higher level that is near the vertical axis arrow. The closed-in-bore evaluation or diagnostic state is not active when trace 314 is near the level of the horizontal axis. The horizontal axis represents time and time increases from the left side of the plot to the right side of the plot. Trace 314 represents the closed-in-bore evaluation or diagnostic state.

At time t0, the driveline disconnect clutch is fully closed and the closed-in-bore evaluation is not activated. The traction battery is being charged and the low voltage battery is being charged. The requested torque reserve is greater than threshold 350 and vehicle speed is less than threshold 360. The driver demand plus accessory torque is less than threshold 370. The closed-in-bore evaluation is prevented during these conditions because a larger amount of air flow into the engine is needed to meet the requested engine torque reserve.

At time t1, the requested engine torque reserve is reduced to less than threshold 350 and the closed-in-bore evaluation is started in response to conditions being present for closed-in-bore diagnostics. The driveline disconnect clutch remains closed and charging the traction battery and the low voltage battery is prevented so that air flow into the engine may be low. During the closed-in-bore evaluation, the engine throttle opening amount may be reduced gradually until a predetermined engine air flow is achieved. The engine throttle position that provides the predetermined air flow is stored to controller memory as a baseline throttle position for operating the engine at engine idle speed. The engine may be rotated at a constant speed during the closed-in-bore diagnostic so that engine air flow may be constant during the closed-in-bore diagnostic.

A break in the sequence occurs before time t2.

At time t2, the driveline disconnect clutch is fully open and the closed-in-bore evaluation is not activated. The traction battery is not being charged and the low voltage battery is being charged. The requested torque reserve is greater than threshold 350 and vehicle speed is less than threshold 360. The driver demand plus accessory torque is less than threshold 370. The closed-in-bore evaluation is prevented during these conditions because a larger amount of air flow into the engine is needed to meet the requested engine torque reserve.

At time t3, the requested engine torque reserve is reduced to less than threshold 350 and the closed-in-bore evaluation is started in response to conditions being present for closed-in-bore diagnostics. The driveline disconnect clutch remains open and charging of the low voltage battery is prevented so that air flow into the engine may be low.

In this way, a closed-in-bore diagnostic may be performed whether or not a driveline disconnect clutch is open or closed. The closed-in-bore diagnostic may cause charging of a low voltage battery and the traction battery to cease, thereby allowing the engine to maintain a desired speed at a low air flow where sludge within the throttle may be detected.

Referring now to FIG. 4, a method for performing closed-in-bore diagnostics for a hybrid vehicle is shown. The method of FIG. 4 may be at least partially implemented as executable instructions stored in memory of one or more controllers in the system of FIGS. 1 and 2. Further, the method of FIG. 4 may include actions taken in the physical world by a controller to transform an operating state of the system of FIGS. 1 and 2. Additionally, the method of FIG. 4 may provide at least portions of the operating sequence shown in FIG. 3.

Closed-in-bore diagnostics seek to determine whether or not sludge may have accumulated in a bore of an engine throttle. If present, the sludge may reduce engine air flow as compared to engine air flow if sludge is not present. The reduction in engine air flow may be particularly noticeable at low throttle angles (e.g., a base throttle angle). If there is sludge build-up and the throttle is closed to a small angle, the engine may misfire and/or stall. However, if it is known that sludge is present in the throttle, an offset throttle opening amount may be added to the base throttle angle so that an expected amount of air flows to the engine at idle conditions and the engine does not misfire or stall during idle conditions.

At 402, method 400 determines vehicle operating conditions. Vehicle operating conditions may include but are not limited to vehicle speed, driver demand torque or power, engine temperature, integrated starter/generator speed and torque, engine speed, and state of battery charge. Method 400 proceeds to 404.

At 404, method 400 judges whether conditions are present for performing closed-in-bore diagnostics. If so, the answer is yes and method 400 proceeds to 406. Otherwise, the answer is no and method 400 proceeds to 420. In one example, the conditions for performing closed-in-bore diagnostics include vehicle speed less than a threshold speed, driver demand plus accessory torque (e.g., torque the engine provides to operate power steering, air conditioning, water pumps, etc.) is less than a first threshold torque, and requested engine reserve torque (e.g.,) is less than a second threshold torque. The vehicle speed being less than the threshold speed condition is used to recognize conditions (e.g., idle and creep (releasing a brake pedal from zero vehicle speed without applying the driver demand pedal)) where it is expected that engine air flow will be low for a long enough period of time to complete the closed-in-bore diagnostic. The driver demand plus accessory torque being less than a threshold ensures engine air flow is low so that the engine may be operated at with a low throttle angle. Finally, the requested engine reserve torque begin less than a threshold ensures low engine air flow by not operating the engine inefficiently.

At 420, method 400 permits charging of the traction and low voltage batteries. The traction and low voltage batteries may be changed by torque that is provided via the internal combustion engine and/or regenerative braking torque. Method 400 proceeds to exit.

At 406, method 400 judges whether or not the driveline disconnect clutch is fully closed. If method 400 judges that the driveline disconnect clutch is fully closed, the answer is yes and method 400 proceeds to 408. Otherwise, the answer is no and method 400 proceeds to 430.

At 430, method 400 restricts charging of the electric energy storage device (e.g., low voltage battery (e.g., 263 of FIG. 2)) from torque generated by the internal combustion engine. The restriction may include providing zero electric charge to the low voltage battery or allowing a lower level of battery charging. Method 400 may restrict charging of the low voltage battery via adjusting field strength of an alternator (e.g., 288 of FIG. 2). Method 400 proceeds to 432.

At 432, method 400 operates the engine at a predetermined idle speed while adjusting engine throttle position and determining what engine throttle position causes the engine to consume a predetermined air flow (e.g., a target engine air flow for engine idle conditions). In one example, the engine may be operated in a speed control mode where spark timing is adjusted to control engine torque and engine torque is allowed to vary while engine speed is controlled to follow a target engine speed (e.g., a constant engine idle speed). The engine throttle is adjusted while the engine rotates at a constant speed and air flow through the engine is determined (e.g., via a mass air flow sensor). Method 400 records to memory a throttle position or angle at which engine air flow is substantially equal to (e.g., within ±5% of the predetermined air flow) a predetermined air flow. For example, the engine throttle angle may be gradually closed from a more open position to a more closed position until the engine air flow is substantially equal to the predetermined engine air flow. Method 400 proceeds to 434.

At 434, method adjusts the base throttle position to equal the throttle position that was determined at step 432 (e.g., the throttle position that provides the predetermined engine air flow amount). The base throttle position is a position that the engine throttle returns to when the driver demand pedal is not applied. Method 400 proceeds to exit.

At 408, method 400 restricts charging of the electric energy storage device (e.g., low voltage battery (e.g., 263 of FIG. 2)) and the traction battery via torque from the internal combustion engine. The restriction may include providing zero electric charge to the low voltage battery and the traction battery via the integrated starter/generator 240. Method 400 may restrict charging of the low voltage battery and the traction battery via adjusting switching within inverter 247. Method 400 proceeds to 410.

At 410, method 400 operates the engine at a predetermined idle speed while adjusting engine throttle position and determining what engine throttle position causes the engine to consume a predetermined air flow (e.g., a target engine air flow for engine idle conditions). In one example, the integrated starter/generator 240 may be operated in a speed control mode and the engine may be operated in a torque control mode where engine torque is adjusted via spark timing to control engine torque and engine speed is controlled via integrated starter/generator 240. Engine speed and integrated starter/generator speed is controlled to follow a target engine speed (e.g., a constant engine idle speed). The engine throttle is adjusted while the engine rotates at a constant speed and air flow through the engine is determined (e.g., via a mass air flow sensor). Method 400 records to memory a throttle position or angle at which engine air flow is substantially equal to (e.g., within ±5% of the predetermined air flow) a predetermined air flow. For example, the engine throttle angle may be gradually closed from a more open position to a more closed position until the engine air flow is substantially equal to the predetermined engine air flow. Method 400 proceeds to 412.

At 412, method adjusts the base throttle position to equal the throttle position that was determined at step 410 (e.g., the throttle position that provides the predetermined engine air flow amount). The base throttle position is a position that the engine throttle returns to when the driver demand pedal is not applied. Method 400 proceeds to exit.

In this way, a closed-in-bore diagnostic may be entered with little impact on vehicle operation and/or drivability. If the conditions are not present for closed-in-bore diagnostics, method 400 may permit charging of electric energy storage devices.

The method of FIG. 4 provides for a method for operating a vehicle, comprising: via one or more controllers, initiating a closed-in-bore diagnostic in response to a driveline disconnect clutch being fully closed, a vehicle speed being less than a threshold speed, a driver demand torque plus an accessory load torque being less than a first threshold torque, and a requested engine reserve torque being less than a second threshold torque. In a first example, the method includes where the closed-in-bore diagnostic includes reducing an opening amount of an engine throttle and determining engine air flow. In a second example that may include the first example, the method includes where the closed-in-bore diagnostic includes rotating the engine at a fixed speed. In a third example that may include one or both of the first and second examples, the method includes where the closed-in-bore diagnostic includes operating an electric machine in a speed control mode and operating an internal combustion engine in a speed control mode. In a fourth example that may include one or more of the first through third examples, the method includes where the driveline disconnect clutch is positioned in a driveline between the engine and the electric machine. In a fifth example that may include one or more of the first through fourth examples, the method further comprises ceasing the closed-in-bore diagnostic in response to the driveline disconnect clutch opening, the vehicle speed exceeding the threshold speed, the driver demand torque plus the accessory load torque being greater than the first threshold torque, or the requested engine reserve torque being greater than the second threshold torque. In a sixth example that may include one or more of the first through fifth examples, the method includes where the closed-in-bore diagnostic includes determining a throttle position where engine air flow is substantially equal to a predetermined engine air flow. In a seventh example that may include one or more of the first through sixth examples, the method includes where the throttle position is determined via reducing an opening amount of an engine throttle and determining engine air flow.

The method of FIG. 4 also provides for a method for operating a vehicle, comprising: via one or more controllers, initiating a closed-in-bore diagnostic in response to a driveline disconnect clutch being fully closed, a vehicle speed being less than a threshold speed, a driver demand torque plus an accessory load torque being less than a first threshold torque, and a requested engine reserve torque being less than a second threshold torque; and reducing charging of one or more batteries during the closed-in-bore diagnostic. In a first example, the method includes where the one or more batteries includes a traction battery. In a second example that may include the first example, the method includes where the one or more batteries includes a battery that is electrically coupled to a flywheel starter. In a third example that may include one or both of the first and second examples, the method includes where the closed-in-bore diagnostic includes reducing an opening amount of an engine throttle and determining engine air flow. In a fourth example that may include one or more of the first through third examples, the method of claim 16, where the closed-in-bore diagnostic includes rotating an internal combustion engine at a constant speed.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
via one or more controllers, initiating a closed-in-bore diagnostic in response to a driveline disconnect clutch being fully closed, a vehicle speed being less than a threshold speed, a driver demand torque plus an accessory load torque being less than a first threshold torque, and a requested engine reserve torque being less than a second threshold torque.

2. The method of claim 1, where the closed-in-bore diagnostic includes reducing an opening amount of an engine throttle and determining engine air flow.

3. The method of claim 2, where the closed-in-bore diagnostic includes rotating an internal combustion engine at a fixed speed.

4. The method of claim 3, where the closed-in-bore diagnostic includes operating the internal combustion engine in a speed control mode.

5. The method of claim 1, where the driveline disconnect clutch is positioned in a driveline between an engine and an electric machine.

6. The method of claim 1, further comprising ceasing the closed-in-bore diagnostic in response to the driveline disconnect clutch being opened, the vehicle speed exceeding the threshold speed, the driver demand torque plus the accessory load torque being greater than the first threshold torque, or the requested engine reserve torque being greater than the second threshold torque.

7. The method of claim 1, where the closed-in-bore diagnostic includes determining a throttle position where engine air flow is substantially equal to a predetermined engine air flow.

8. The method of claim 7, where the throttle position is determined via reducing an opening amount of an engine throttle and determining engine air flow.

9. A system, comprising:
an internal combustion engine;
an integrated starter/generator;
a disconnect clutch positioned in a driveline between the internal combustion engine and the integrated starter/generator;
a transmission included in the driveline;
a low voltage battery;
a traction battery; and
a controller including executable instructions stored in non-transitory memory that cause the controller to begin a closed-in-bore diagnostic and reduce charging of the low voltage battery in response to a vehicle speed being less than a threshold speed, a driver demand torque plus an accessory load torque being less than a first threshold torque, and a requested engine reserve torque being less than a second threshold torque.

10. The system of claim 9, further comprising additional instructions to reduce charging of the traction battery when the disconnect clutch is closed.

11. The system of claim 10, where the low voltage battery is coupled to a flywheel starter.

12. The system of claim 9, where the closed-in-bore diagnostic is performed when the disconnect clutch is fully open.

13. The system of claim 9, further comprising additional instructions to reduce an opening amount of an engine throttle.

14. The system of claim 13, further comprising additional instructions to determine an engine air flow during the closed-in-bore diagnostic.

15. The system of claim 14, further comprising additional instructions to determine a position of the engine throttle where the engine air flow is substantially equal to a predetermined air flow.

16. A method for operating a vehicle, comprising:
via one or more controllers, initiating a closed-in-bore diagnostic in response to a driveline disconnect clutch being fully closed, a vehicle speed being less than a threshold speed, a driver demand torque plus an accessory load torque being less than a first threshold torque, and a requested engine reserve torque being less than a second threshold torque; and
reducing charging of one or more batteries during the closed-in-bore diagnostic.

17. The method of claim 16, where the one or more batteries includes a traction battery.

18. The method of claim 16, where the one or more batteries includes a battery that is electrically coupled to a flywheel starter.

19. The method of claim 16, where the closed-in-bore diagnostic includes reducing an opening amount of an engine throttle and determining engine air flow.

20. The method of claim 16, where the closed-in-bore diagnostic includes rotating an internal combustion engine at a constant speed.

* * * * *